(No Model.)

F. M. HAMMAN.
MEANS FOR REPAIRING CYCLE TIRES.

No. 496,359. Patented Apr. 25, 1893.

WITNESSES
Jesse Heller.
Philip O. Masi.

INVENTOR
Frank M. Hamman
by E. W. Anderson
his Attorney

UNITED STATES PATENT OFFICE.

FRANK M. HAMMAN, OF GOSHEN, INDIANA, ASSIGNOR TO THE ARIEL CYCLE MANUFACTURING COMPANY, OF SAME PLACE.

MEANS FOR REPAIRING CYCLE-TIRES.

SPECIFICATION forming part of Letters Patent No. 496,359, dated April 25, 1893.

Application filed November 30, 1892. Serial No. 453,571. (No model.)

*To all whom it may concern:*

Be it known that I, FRANK M. HAMMAN, a citizen of the United States, and a resident of Goshen, in the county of Elkhart and State of Indiana, have invented certain new and useful Improvements in Means for Repairing Cycle-Tires; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
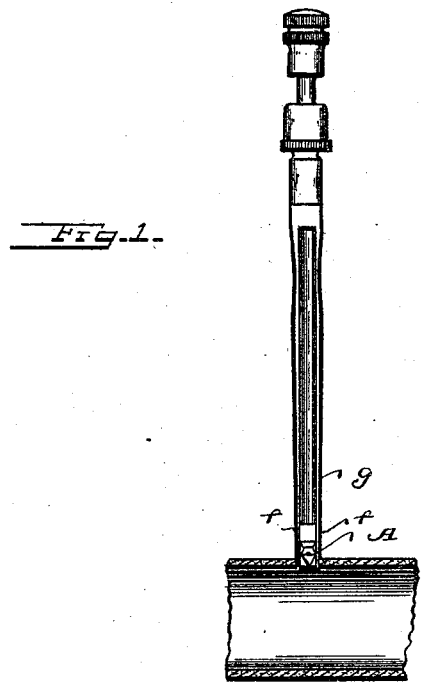
Figure 2:
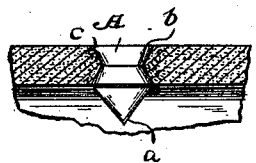
Figure 3:

Figure 1 of the drawings is a side elevation of the tool and plug with the tire in section. Fig. 2 is an enlarged sectional detail view of tire with plug inserted, and Fig. 3 is a perspective view of the plug.

This invention has relation to certain new and useful improvements in means for repairing pneumatic cycle tires, and it consists in the novel construction and combination of parts, all as hereinafter specified, and pointed out in the claim.

It has been found by experience that the pneumatic tires now commonly used on cycles, are liable to puncture from contact with various sharp objects or obstacles, such puncture being a serious incident for a rider, inasmuch as the air escapes from the tire, and the latter collapses. It frequently happens also that a puncture occurs while the rider is on the road, and at a distance from a repair shop.

The object of this invention is therefore, to provide a simple method and means for repairing such puncture, in order that a rider, wherever he may be, if provided with the invention, can quickly and readily repair the injury without recourse to a shop and without serious loss of time, or expense.

The invention consists particularly in a small, cylindrical, rubber plug, such as shown at A in the accompanying drawings, said plug having preferably a conical point $a$, tapering up to an annular groove $b$, intermediate of the two ends, and a square, or it may be, slightly convex outer end $c$. When a puncture occurs in a tire, the point of a suitable tool, which may be that shown in Fig. 1, and fully described and claimed in my concurrent application, Serial No. 453,570, is inserted in the puncture, which is thereby expanded to a sufficient extent to allow the insertion of the plug A, a small quantity of suitable cement being first introduced. The tool is then withdrawn, and the tire contracts tightly around the plug, and into the annular groove $b$, and together with the cement, effectually retains the said plug in place. The plug should be inserted sufficiently far so that its outer end will seat flush with the wearing surface of the tire. When the tool above referred to is employed, the spring points $f, f$, are first inserted in the puncture to a sufficient extent, and the hole is expanded by forcing downwardly a small plunger $g$, working between said points. The plug may then be placed between the points, and the stroke of the plunger continued, which will force the plug to its seat, the foot of the plunger at this moment coming in contact with the tire, and acting to withdraw the points. It will be observed that the expense of the plug is but slight, and that a number of these, together with the tool and necessary cement, can be readily carried in the tool box, or pocket. It is also evident that but a few minutes are required to repair a puncture. The plugs may be of different sizes to suit the character of the puncture, and of any suitable material, rubber being preferred.

Having described this invention, what I claim, and desire to secure by Letters Patent, is—

The herein described plug for repairing tires, said plug comprising a conical point $a$, tapering up to an annular groove $b$ in the body of the plug, said groove having a wedge shape, and a head arranged to seat flush with the outer surface of the tire, said plug being of such a length that when in place the point $a$ is substantially entirely through the tread of the tire, within the interior thereof, while the groove $b$ is centrally within the thickness of said tread, substantially as specified.

In testimony whereof I affix my signature in presence of two witnesses.

FRANK M. HAMMAN.

Witnesses:
 GEORGE W. WINTERS,
 FRANCIS E. BAKER.